(12) United States Patent
Kazama et al.

(10) Patent No.: US 8,418,558 B2
(45) Date of Patent: Apr. 16, 2013

(54) ACCELERATION SENSOR ELEMENT AND ACCELERATION SENSOR HAVING SAME

(75) Inventors: Atsushi Kazama, Hitachinaka (JP); Masakatsu Saitoh, Tokyo (JP); Ryoji Okada, Tokyo (JP); Yasuhiro Hamaguchi, Tokyo (JP)

(73) Assignee: Torex Semiconductor Ltd., Tokyo (JP)

( * ) Notice: Subject to any disclaimer, the term of this patent is extended or adjusted under 35 U.S.C. 154(b) by 306 days.

(21) Appl. No.: 12/790,136

(22) Filed: May 28, 2010

(65) Prior Publication Data

US 2010/0300205 A1 Dec. 2, 2010

(30) Foreign Application Priority Data

May 29, 2009 (JP) ................. 2009-130264

(51) Int. Cl.
*G01P 15/12* (2006.01)
*G01P 15/00* (2006.01)

(52) U.S. Cl.
USPC .................................... 73/514.33; 73/514.38

(58) Field of Classification Search ............... 73/514.33, 73/514.36, 514.38, 493
See application file for complete search history.

(56) References Cited

U.S. PATENT DOCUMENTS

| | | | | |
|---|---|---|---|---|
| 6,122,963 | A * | 9/2000 | Hammond et al. | 73/514.32 |
| 2005/0056096 | A1* | 3/2005 | Ozawa et al. | 73/514.36 |
| 2006/0065054 | A1* | 3/2006 | Ikeda et al. | 73/514.34 |
| 2008/0034867 | A1* | 2/2008 | Kazama et al. | 73/514.33 |
| 2009/0223292 | A1* | 9/2009 | Hatano et al. | 73/514.33 |
| 2009/0282918 | A1* | 11/2009 | Maekawa | 73/514.33 |

FOREIGN PATENT DOCUMENTS

| | | |
|---|---|---|
| JP | 10-170380 A | 6/1998 |
| JP | 2003-172745 A | 6/2003 |
| JP | 2005-337874 A | 12/2005 |
| JP | 2006-098321 A | 4/2006 |

OTHER PUBLICATIONS

English Machine Translation of Goto et al. JP 2005-337874 A, dated Aug. 8, 2005, translated May 2012.*

* cited by examiner

*Primary Examiner* — Hezron E Williams
*Assistant Examiner* — David Z Huang
(74) *Attorney, Agent, or Firm* — Sughrue Mion, PLLC

(57) ABSTRACT

A covered acceleration sensor element includes a support frame portion surrounding a weight portion, a plurality of flexible beam portions for connecting the weight portion to the support frame portion, and piezoresistance elements provided on the beam portions. An upper cover and a lower cover enclosing the periphery of the weight portion together with the support frame portion are joined to the face and back of the support frame portion. The support frame portion is separated by separation grooves into an inner frame and an outer frame. The plurality of inner frame support portions has flexibility. The beam portions are connected to both sides of the weight portion along the second axis and the third axis. The inner frame support portions are connected to both sides of the inner frame in a direction in which they are rotated nearly 45 degrees from the second axis and the third axis.

7 Claims, 13 Drawing Sheets

ACCELERATION SENSOR ELEMENT AND ACCELERATION SENSOR HAVING SAME

The entire disclosure of Japanese Patent Application No. 2009-130264 filed May 29, 2009 is expressly incorporated by reference herein.

TECHNICAL FIELD

This invention relates to a semiconductor acceleration sensor for detection of acceleration, which is used in automobiles, aircraft, portable terminal equipment, toys, etc.

BACKGROUND ART

An acceleration sensor is often used as a sensor for actuating an air bag of an automobile, and detects an impact in a collision of the automobile as acceleration. For the automobile, a one-axis (uniaxial) or two-axis (biaxial) detection function has been enough to measure acceleration on the X-axis and/or the Y-axis. The acceleration to be measured has been very great. Recently, the acceleration sensor has found frequent use in portable terminal equipment and robots, and there has been demand for a three-axis (triaxial) acceleration sensor for measuring accelerations in the X-, Y- and Z-axis directions, in order to detect spatial movements. Also, there has been demand for a high-resolution downsized sensor for detection of micro-acceleration.

Many acceleration sensors adopt a configuration in which the movement of a weight portion or a flexible portion is converted into an electrical signal. Among the acceleration sensors with this configuration are those of the piezoresistor or piezoresistance element type which detect the movement of the weight portion from a change in the resistance of the piezoresistance element provided in the flexible portion coupled to the weight portion, and those of the electrostatic capacity type which detect the movement of the weight portion from a change in electrostatic capacity between the weight portion and a fixed electrode.

Conventional triaxial acceleration sensors shown in Patent Document 1 and Patent Document 2 will be described below. In a triaxial acceleration sensor 101, as shown in FIGS. 11 and 12, a triaxial acceleration sensor element 103, and an IC 104 for control, which performs the amplification, temperature compensation, etc. of a sensor element signal, are laminated and fixed within a ceramic case 102. A cover 105 and the case 102 are joined together to seal up the triaxial acceleration sensor element 103 and the IC 104 within the case 102. As shown in FIG. 12, the triaxial acceleration sensor element 103 is secured to the case 102 with the use of a resin adhesive material 106, and the IC 104 is secured onto the triaxial acceleration sensor element 103 with the use of a resin adhesive material 107.

The triaxial acceleration sensor element 103 has sensor terminals 108, the IC 104 has IC terminals 109, and the case 102 has case terminals 110. The sensor terminals 105 and the IC terminals 109 are interconnected by wires 111, and the IC terminals 109 and the case terminals 110 are interconnected by the same wires 111, so that signals from the sensor are taken outwardly from output terminals 112 interconnected to the case terminals 110 provided in the case 102. The cover 105 is secured to the case 102 by an adhesive material 102a such as a AuSn solder.

In a plan view shown in FIG. 13, the triaxial acceleration sensor element 103 includes a square support frame portion 113, a weight portion 114, and paired beam portions sandwiching the weight portion 114, the weight portion 114 being held in the center of the support frame portion 113 by the two pairs of beam portions 30. Piezoresistance elements are provided in the beam portions 115.

X-axis piezoresistance elements 116 and Z-axis piezoresistance elements 118 are provided in the pair of beam portions 115, and Y-axis piezoresistance elements 117 are provided in the other pair of beam portions 115. The piezoresistance elements are arranged at the four bases of the pair of beam portions 115, and they are interconnected to constitute a bridge circuit. By so doing, uniform resistance changes in the piezoresistance elements are cancelled. By changing the manner of connection of the bridge circuit, moreover, accelerations on the X-axis, the Y-axis and the Z-axis are separated and detected. The sensor terminals 108 are arranged on the support frame portion 113.

The principle of acceleration detection by the bridge circuit will be described by reference to FIGS. 14A to 14D. FIGS. 14A and 14B show the movements of the weight portion 114 when accelerations are applied in the X direction and the Z direction by X-Z planes. When acceleration is applied in the X direction as in FIG. 14A, for example, the weight portion 114 rotates about its site in the vicinity of its upper end center, whereupon the beam portions 115 deform. In accordance with the deformation of the beam portions 115, stress imposed on four X-axis piezoresistance elements X1 to X4 provided on the upper surface of the beam portions 115 changes, and resistance also changes. In this case, X1 and X3 are subjected to tensile stress, while X2 and X4 are placed under compressive stress. As a result, a difference appears in the midpoint potential of a bridge circuit for X-axis detection shown in FIG. 14C, so that an output conformed to the magnitude of acceleration is obtained. When acceleration in the Z direction is applied as shown in FIG. 14B, on the other hand, tensile stress acts on piezoresistance elements Z2, Z3 and compressive stress acts on piezoresistance elements Z1, Z4, with the result that an output is obtained by a bridge circuit for Z-axis detection in FIG. 14D.

The X-axis piezoresistance elements X1 to X4 and the Z-axis piezoresistance elements Z1 to Z4 are formed on the same beam portions 115, but they are different in the configuration of the bridge circuit. Thus, even if the beam portions 115 deform, as in FIG. 14A, in response to the X-direction acceleration, for example, the change in resistance is cancelled in the bridge circuit for Z-axis detection in FIG. 14D, and no change occurs in the output. In this manner, the X-axis acceleration and the Z-axis acceleration can be separated and detected. Detection of the Y-axis acceleration is carried out by the piezoresistance elements formed on the other pair of the beam portions 115 orthogonal to the X-axis, as is done for detection of the X-axis acceleration.

On the other hand, a method for realizing a downsized and inexpensive acceleration sensor by use of a resin protected package technology widely used in a semiconductor mounting technology is known, as shown in Patent Document 3. With this method, a technology for joining covers to the top and bottom of a triaxial acceleration sensor element 103 having movable portions to encapsulate it is used to protect the triaxial acceleration sensor element from a molding resin.

FIG. 15A shows a sectional view of the assembly structure of a triaxial acceleration sensor element having covers joined to the top and bottom thereof by the above-mentioned method, and FIG. 15B shows a plan view of a triaxial acceleration sensor element 120. An upper cover 121 and a lower cover 122 are joined to the top and bottom of the triaxial acceleration sensor element 120 to encapsulate movable portions of the triaxial acceleration sensor element 120 in a closed space. Joining of the triaxial acceleration sensor element 120, the upper cover 121, and the lower cover 122 is carried out by various methods, such as metal bonding or anodic bonding. Here, metal bonding will be shown as an example.

A joining metal region 123 as shown in FIG. 15B is formed on the face and back of the triaxial acceleration sensor element 120. Joining metal regions are also formed in the upper cover 121 and the lower cover 122. They are superposed, pressurized and heated for joining. With this joining step, before the triaxial acceleration sensor elements 120 are taken as individual pieces from a silicon wafer, the silicon wafer having many of the triaxial acceleration sensor elements 120 formed therein, an upper cover silicon wafer having many of the upper covers 122 formed therein with the same pitch, and a lower cover silicon wafer having many of the lower covers 123 formed therein with the same pitch are joined together. This step is called wafer level packaging (hereinafter referred to as WLP). After the closed space is formed by the WLP, the resulting composite is divided into individual chips by dicing. Hereinafter, the individual chip after encapsulation by the WLP will be termed a covered acceleration sensor element 124.

Next, a triaxial acceleration sensor 125 assembled into a package using resin will be described by reference to a sectional view in FIG. 16. An IC 127 for control is fixed onto a lead frame 126 with an adhesive material 128, and the covered acceleration sensor element 124 is fixed onto the IC 127 with an adhesive material 129. Sensor terminals 130 of the covered acceleration sensor element 124 and IC terminals 131 of the IC 127 are connected using wires 132, and the IC terminals 131 and terminals of the lead frame 126 are connected by wires. A structure assembled from the covered acceleration sensor element 124, the IC 127, and the lead frame 126 is molded with a molding resin 133 by use of the transfer mold method. After the resin is cured within, a die, the product is withdrawn from the die to obtain the triaxial acceleration sensor 125. There may be adopted a method in which a plurality of the triaxial acceleration sensors are handled collectively up to the stage of resin molding, released from the die, and then diced to separate them into the individual triaxial acceleration sensors.

With the above-described acceleration sensor obtained using the WLP and resin mold packaging, the movable portions of the triaxial acceleration sensor element 120 can be protected in the silicon wafer stage. Thus, handling in subsequent steps is easy, and does not require strict control over foreign matter. Since the movable portions of the triaxial acceleration sensor element 120 are protected, moreover, the surroundings can be encapsulated by the transfer mold method. In this manner, package assembly can be performed by the resin mold packaging technology, which is often used for conventional IC chips, without the need to use an expensive ceramic package, whereby a small and inexpensive triaxial acceleration sensor can be realized.

The triaxial acceleration sensor 125 shown in FIG. 16, however, poses the following problems in comparison with the triaxial acceleration sensor 101 shown in FIG. 12.

The molding resin and the lead frame used in the triaxial acceleration sensor 125 are different from silicon, which is the material for the covered acceleration sensor element, in the coefficient of thermal expansion. Thus, a temperature change causes thermal stress, exerting external force on the covered acceleration sensor element, thereby changing piezoresistance. Furthermore, when the triaxial acceleration sensor 125 is installed by soldering on a product substrate of a subject product to be mounted with a sensor, the influence of thermal expansion of the product substrate is transmitted to the triaxial acceleration sensor 125 and the covered acceleration sensor element via the soldered region.

With the triaxial acceleration sensor 101 of the ceramic package shown in FIG. 12, the triaxial acceleration sensor element 103 is held in the space within the package. By using a flexible material as the resin 107, therefore, force from the product substrate can be minimally transmitted to the triaxial acceleration sensor element 103.

With the resin-packaged triaxial acceleration sensor 125 shown in FIG. 16, on the other hand, the covered acceleration sensor element 124 has its surroundings covered with the molding resin 133, so that force from the product substrate is apt to be transmitted to the triaxial acceleration sensor element 120. If nonuniform stress changes are caused to the four piezoresistance elements on each axis upon application of external force to the triaxial acceleration sensor element 120, the zero-level of output fluctuates to change the output of the sensor (hereinafter, this zero-level fluctuation will be termed an offset change).

The offset change responsive to the temperature change of the acceleration sensor can be corrected with the IC for detection before the sensor is installed on the product substrate. If the influence of force from the product substrate is exerted during mounting of the product, however, the outcome is produced that the sensor, when installed on the product substrate of various subject products, differs in the characteristics of the change responsive to the temperature.

When the external force from the wiring substrate or the protective package is applied to the covered acceleration sensor element 124, the disposition of the covered acceleration sensor element 124 near the center of the package allows its deformation due to the external force to be nearly bilaterally symmetrical, with the result that outputs on the X-axis and the Y-axis remain unchanged.

However, if a difference occurs between the piezoresistance element near the frame portion (will hereinafter be termed the frame-side piezoresistance element) and the piezoresistance element near the weight portion (will hereinafter be termed the weight-side piezoresistance element), output on the Z-axis changes.

Patent Document 4 describes an acceleration sensor whose output minimally changes under the influence of external force. In this acceleration sensor, stress separation grooves are formed in a frame body to separate it into an outer frame and an inner frame, and both frames are connected by stress relaxation beams having flexibility. The outer frame is connected to a support substrate, and the inner frame is joined to the support substrate by a partial junction. A cover body enclosing the inner frame and a weight portion together with the support substrate and the outer frame is joined to the outer frame. The area of joining of the inner frame to the support substrate is rendered relatively small, and the inner frame is connected to the outer frame by the stress relaxation beams. Thus, even if thermal stress occurs in the outer frame or the support substrate, the inner frame is minimally deformed, so that variations in output can be minimally caused.

CITATION LIST

Patent Literature

[Patent Document 1] JP-A-2003-172745
[Patent Document 2] JP-A-2006-098321
[Patent Document 3] JP-A-10-170380
[Patent Document 4] JP-A-2005-337874

SUMMARY OF INVENTION

Technical Problem

Generally, the rigidity of the beam portion is designed to be low relative to the weight of the weight portion in order to realize a highly sensitive acceleration sensor. Thus, the beam portion is easily destructible under an impact or the like. In the aforementioned covered acceleration sensor element encapsulated by the WLP, the upper cover and the lower cover play the role of stoppers for regulating the excessive deviation of the weight portion. To obtain high impact resistance, the gaps between the weight portion and the upper cover and the lower cover are rendered very small. By so doing, the weight portion collides with the cover before being accelerated, so that stress generated in the collision can be decreased. The smaller the gap, the higher an air damping action can be made. An increase in the air damping action has the effect of reducing noise due to resonance of the sensor.

In the acceleration sensor of Patent Document 4, the inner frame is joined to the support substrate at the one point. Thus, this acceleration sensor poses the problem that if the support substrate warps, the inner frame is displaced about the junction and tends to contact the support substrate or the cover body. In recent years, customers have expressed a strong demand for the thinning of the entire acceleration sensor. However, the support substrate thinned to meet this demand is liable to warpage, thereby aggravating the above-mentioned problem. It is an object of the present invention to realize an acceleration sensor whose output minimally changes in response to external force and which can achieve both of high sensitivity and impact resistance.

Solution to Problem

The present invention provides a covered acceleration sensor element including a weight portion, a support frame portion surrounding the weight portion, a plurality of flexible beam portions for connecting the weight portion to the support frame portion to support the weight portion, piezoresistance elements provided on the beam portions, and wirings for connecting them, the covered acceleration sensor element being configured such that an upper cover and a lower cover enclosing a periphery of the weight portion together with the support frame portion are joined to a face and a back of the support frame portion, and the covered acceleration sensor element being adapted to detect acceleration in a direction of a first axis as a thickness direction in which the upper cover, the support frame portion, and the lower cover are stacked, and acceleration in a direction of at least one of a second axis in a plane perpendicular to the first axis, and a third axis in the plane and perpendicular to the second axis, from changes in resistances of the piezoresistance elements, wherein the support frame portion is separated by separation grooves into an inner frame and an outer frame surrounding a periphery of the inner frame, the upper cover and the lower cover are joined to the outer frame, and the inner frame is connected to and held by the outer frame via a plurality of inner frame support portions having flexibility, and the beam portions are connected to both sides of the weight portion along at least one of the second axis and the third axis, and the inner frame support portions are connected to both sides of the inner frame after being rotated through a predetermined angle from the at least one of the second axis and the third axis in a direction in which an influence of deformation of the outer frame is minimally transmitted to the beam portions.

According to the above-described features, the inner frame is separated from the outer frame, the upper cover and the lower cover, and is supported by the inner frame support portions having flexibility. Thus, even if external force acts on the outer frame, the upper cover and the lower cover under thermal stress during assembly into the resin package and during mounting on the product substrate to deform them, this deformation is minimally transmitted to the inner frame, thus causing little output change. Deformation of the outer frame is somewhat transmitted to the inner frame via the inner frame support portions. However, the inner frame support portions are arranged in directions in which influence is minimally transmitted to the beam portions. Thus, deformation of the inner frame in the vicinity of the inner frame support portion causes little change to the stress on the piezoresistance elements on the beam portions.

If the inner frame is supported from all directions in the surroundings, good symmetry is ensured. Thus, when the outer frame is deformed, relative displacement of the inner frame relative to the upper cover and the lower cover can be kept small, and the gap between the weight portion and the upper cover/lower cover can be decreased. Thus, under impact on the acceleration sensor, stress caused to the beam portion can be rendered low, and impact resistance can be enhanced, because of the effect of minimizing acceleration owing to the short distance until the collision of the weight portion with the upper cover or the lower cover, and the effect of increasing air damping. Since air damping can be increased, moreover, the effects are obtained that high frequency vibrations can be suppressed, vibrations of resonance of the weight portion can be kept down, and noise can be reduced.

The covered acceleration sensor element may be one in which the beam portions are connected to both sides of the weight portion along the second axis, whereby accelerations in the directions of two axes, i.e., the first axis and the second axis, are detected. In this case, the inner frame support portions may be connected to both sides of the inner frame in directions in which they are rotated nearly 45 degrees from the second axis. The same effects are obtained even in the acceleration sensor element for biaxial detection which has the beam portions only in the second-axis direction.

The covered acceleration sensor element may be one in which the beam portions are connected to both sides of the weight portion along the second axis, and accelerations in the directions of two axes, i.e., the first axis and the second axis, are detected. In this case, the inner frame support portions may be connected to both sides of the inner frame along the third axis perpendicular to the second axis. In the acceleration sensor element for biaxial detection which has the beam portions only in the second-axis direction, the inner frame support portions are arranged along the third axis. By so doing, the inner frame support portions are in the remotest arrangement, so that the influence of the deformation of the outer frame can be transmitted to the beam portions more difficulty.

Desirably, the beam portion and the inner frame support portion have the same thickness, and they are thinner than the weight portion and the support frame portion. In order to increase the sensitivity of the acceleration sensor, it is desirable that the weight portion be heavy, and the rigidity of the beam portion be low. Such a configuration is easy to realize by composing the components of a thin silicon layer and a thick silicon layer such that the beam portion is formed only in the thin silicon layer, and the weight portion is formed in the thin silicon layer through the thick silicon layer. It is recommendable that the support frame portion be configured in the same manner as for the weight portion because it requires sufficient rigidity, and that the inner frame support portion be configured in the same manner as for the beam portion because it requires flexibility.

Desirably, the flexural rigidity of the inner frame support portion is higher than the flexural rigidity of the beam portion. When weight portion resonance frequency determined by the rigidity of the beam portion and the weight of the weight portion is compared with inner frame resonance frequency determined by the rigidity of the inner frame support portion and the total weight of the inner frame and the weight portion, it is desirable that the inner frame resonance frequency be sufficiently high compared with the weight portion resonance frequency. Otherwise, in response to a relatively quick change in acceleration, it is likely that the inner frame will be displaced together with the weight portion, with the result that deformation of the beam portion may be hindered, failing to obtain correct sensitivity. It is advisable, at least, that the shape of the inner frame support portion be determined such that the resonance frequency of the inner frame will be higher than the resonance frequency of the weight portion.

An acceleration sensor is constructed by adhering the above-mentioned covered acceleration sensor element onto a lead frame together with an IC chip for control, connecting the lead frame, electrodes on the IC chip, and electrodes on the covered acceleration sensor element by metal wires, and encapsulating the resulting composite with the use of a molding resin. A solder is formed on a surface of the lead frame exposed at the lower surface of the acceleration sensor, which is then reflow-soldered to a product substrate. In this manner, the acceleration sensor can be easily mounted.

Advantageous Effects of Invention

According to the acceleration sensor of the present invention, the junctions of the inner frame support portions to the inner frame are arranged at positions as remote as possible from the junctions of the beam portions to the inner frame. This makes it possible to suppress output changes due to the influence of external force, such as thermal stress during assembly of the acceleration sensor into the resin package, or thermal stress during mounting of the resin-molded acceleration sensor on the product substrate. Furthermore, narrowing of the gap between the weight portion and the cover by the above stress can be suppressed. Since the gap can thus be rendered small, impact strength can be enhanced.

DESCRIPTION OF EMBODIMENTS

An acceleration sensor according to an embodiment of the present invention will be described by reference to the accompanying drawings.

Embodiment 1

Figure 1:
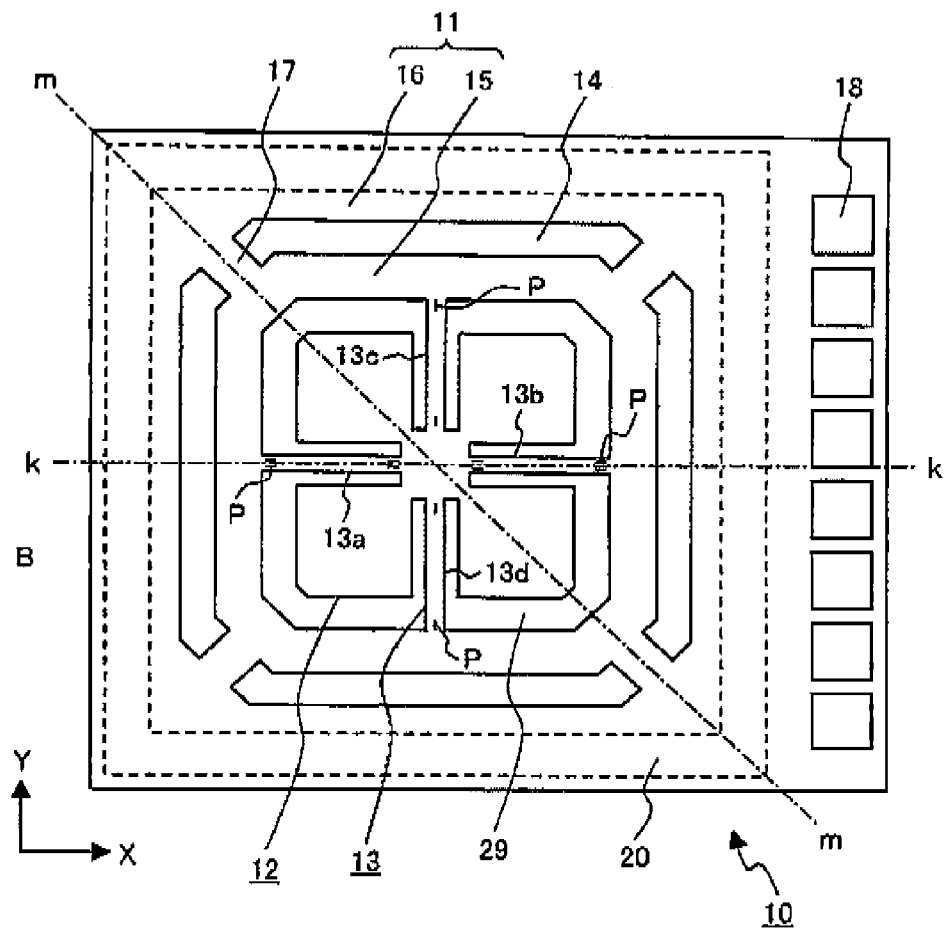
FIG. 1 is a plan view showing the structure of an acceleration sensor element in an embodiment of the present invention.
Figure 2:
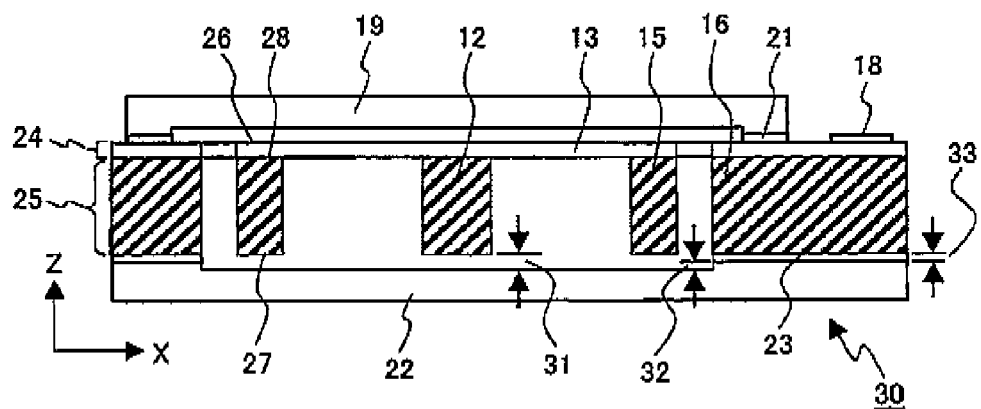
FIG. 2 is a sectional view taken along line k-k in FIG. 1, showing the structure of a covered acceleration sensor element.
Figure 3:
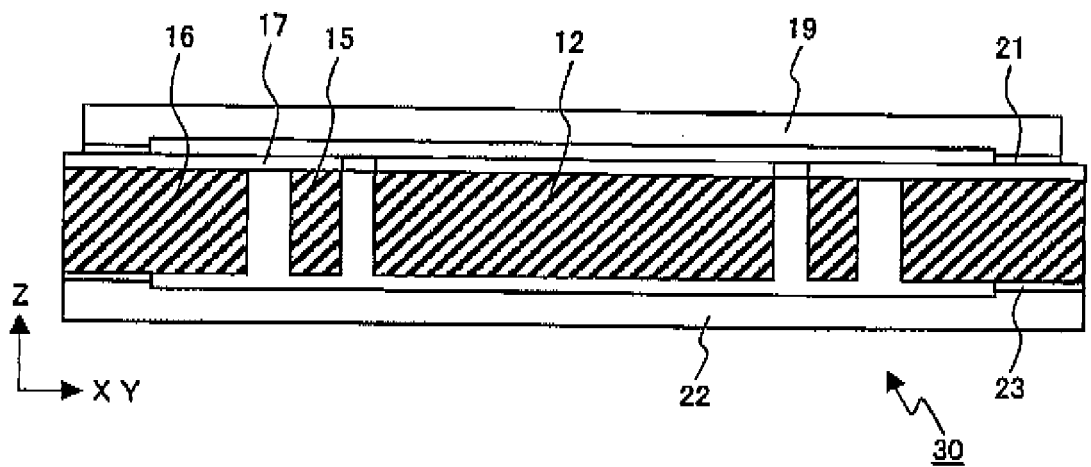
FIG. 3 is a sectional view taken along line m-m in FIG. 1, showing the structure of the covered acceleration sensor element.

FIG. 1 is a plan view showing the structure of an acceleration sensor element 10 in a covered acceleration sensor element 30 of Embodiment 1. FIGS. 2 and 3 are sectional views of the covered acceleration sensor element 30 of Embodiment 1, in which FIG. 2 is a sectional view taken along line k-k in FIG. 1, and FIG. 3 is a sectional view taken along line m-m in FIG. 1.

Figure 16:
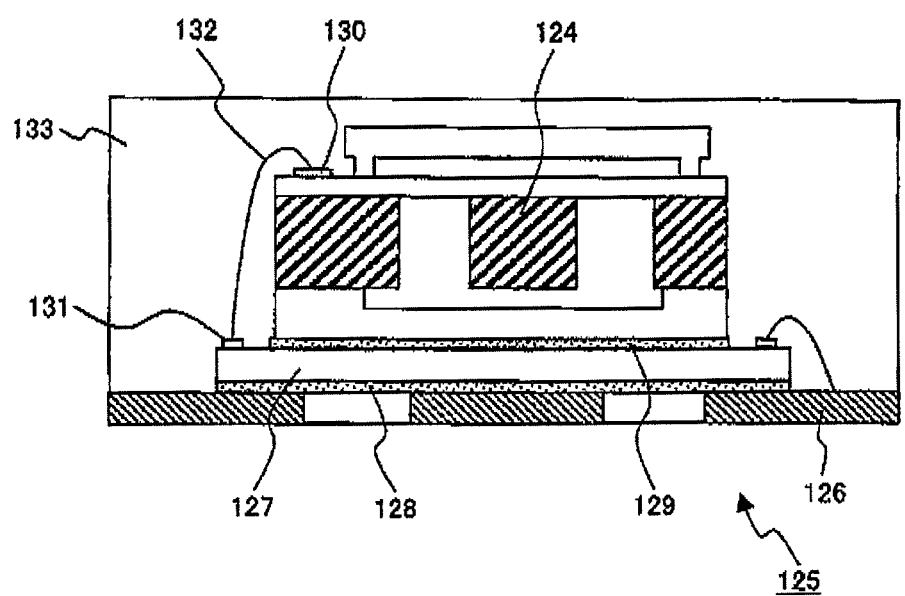
FIG. 16 is a sectional view showing a protected package including a conventional triaxial acceleration sensor.

The acceleration sensor element 10 of Embodiment 1 can be applied, for example, to an acceleration sensor assembled into a resin protected package as shown in FIG. 16 as a conventional example. In Embodiment 1, therefore, the covered acceleration sensor element 30, in particular, will be mainly described in detail.

<Basic Structure>

The acceleration sensor element 10 of Embodiment 1 has a weight portion 12 supported within a support frame portion 11 from all directions by four beam portions 13 having flexibility. The support frame portion 11 is separated by a first separation groove 14 into an inner frame 15 and an outer frame 16 surrounding the inner frame 15, and the beam portions 13 are connected to the inner frame 15. The inner frame 15 is supported on the outer frame 16 from all directions by inner frame support portions 17. The weight portion 12 is separated from the inner frame 15 by a second separation groove 29, and is composed of four body portions and a middle portion connected to the body portions and the beam portions 13.

Figure 13:
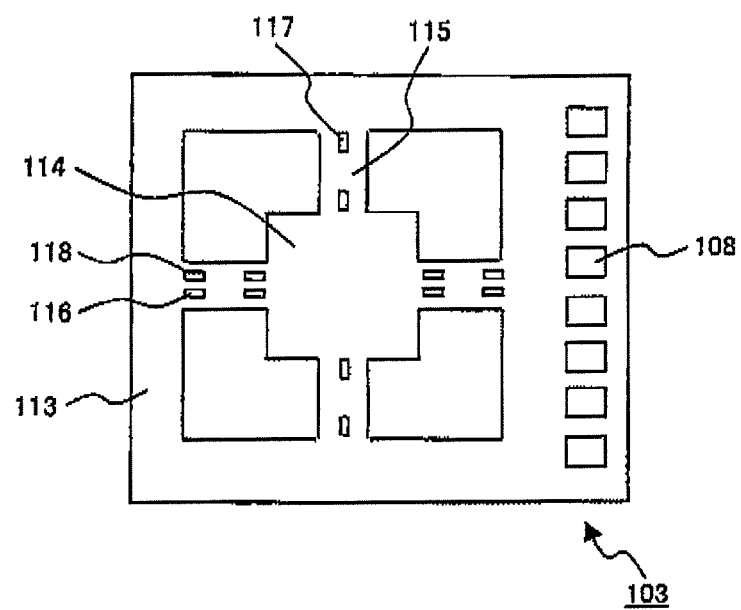
FIG. 13 is a plan view illustrating an example of the structure of a conventional triaxial acceleration sensor element.
Figure 14A:
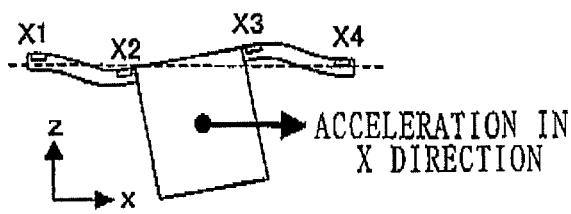
FIG. 14A is an explanation drawing of the principle of detection of the conventional triaxial acceleration sensor element.
Figure 14B:
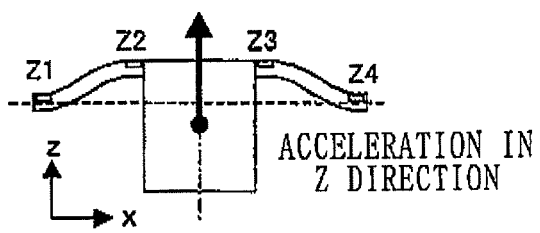
FIG. 14B is an explanation drawing of the principle of detection of the conventional triaxial acceleration sensor element.
Figure 14C:
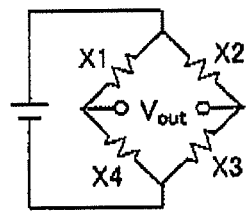
FIG. 14C is an explanation drawing of the principle of detection of the conventional triaxial acceleration sensor element.
Figure 14D:
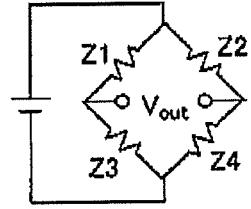
FIG. 14D is an explanation drawing of the principle of detection of the conventional triaxial acceleration sensor element.
Figure 15A:
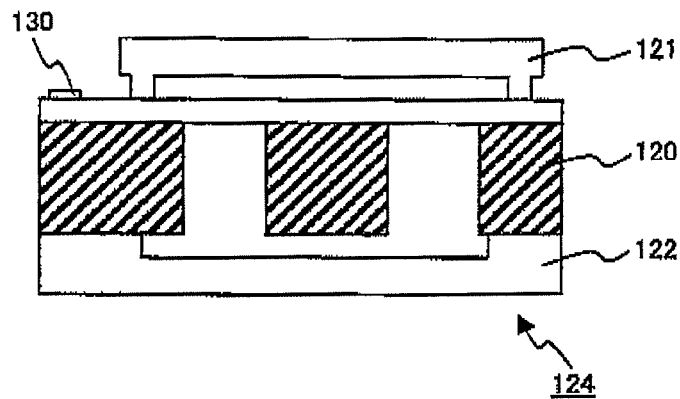
FIG. 15A is a sectional view showing the conventional triaxial acceleration sensor element encapsulated using covers.
Figure 15B:
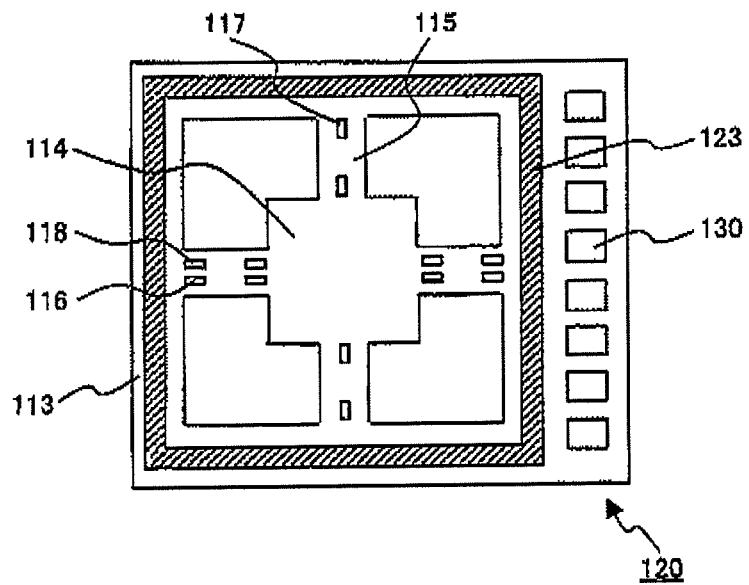
FIG. 15B is a plan view showing the conventional triaxial acceleration sensor element encapsulated using the covers.

The four beam portions 13 are termed a first beam portion 13a, a second beam portion 13b, a third beam portion 13c, and a fourth beam portion 13d. In the acceleration sensor element 10 of Embodiment 1, piezoresistance elements P are formed near the bases of the beam portions 13, as explained in FIG. 13. The piezoresistance elements P for detecting accelerations in the X-axis and Z-axis directions are arranged in the first beam portion 13a and the second beam portion 13b extending in the X-axis direction, while the piezoresistance elements P for detecting acceleration in the Y-axis direction are arranged in the third beam portion 13c and the fourth beam portion 13d extending in the Y-axis direction. The piezoresistance elements P for detecting acceleration in the Z-axis direction may be arranged in the third beam portion 13c and the fourth beam portion 13d. The respective piezoresistance elements P are interconnected by wirings (not shown) so as to form bridge circuits as shown in FIGS. 14A to 14D. The wirings are pulled out onto the outer frame 16 over the inner frame support portions 17, and are connected to electrode pads 18 formed on the outer frame 16.

An upper cover 19 is joined to a surface of the acceleration sensor element 10 where the piezoresistance elements P are formed. This joining is performed using a joining member 21 in conformity with an upper cover joining region 20 on the outer frame 16. Similarly, a lower cover 22 is joined to the opposite surface of the acceleration sensor element 10 with the use of a joining material 23. The upper cover 19 and the lower cover 22 are joined only to the outer frame 16, and the outer frame 16, the upper cover 19, and the lower cover 22 enclose the periphery of the inner frame 15.

<Manufacturing Method>

A method of producing the acceleration sensor element 10 will be described briefly by reference to FIG. 2. The acceleration sensor element 10 was processed using an SOT wafer having a silicon layer with a thickness of about 6 µm on a silicon layer with a thickness of about 400 µm, with a silicon oxide layer about 1 µm thick being sandwiched therebetween. The silicon oxide film layer was used as an etching stop layer for dry etching, and a structure was formed in the two silicon layers. The thin first silicon layer was designated as a first layer 24, and the thick second silicon layer was designated as a second layer 25. A surface of the first layer which was not joined to the silicon oxide film layer was designated as a first surface 26. A surface of the second layer which was not joined to the silicon oxide film layer was designated as a second surface 27. A connected surface for connection via the silicon oxide film layer was designated as a third surface 28.

The shapes of semiconductor piezoresistance elements were patterned using a photoresist, and the first surface 26 was implanted with boron in a concentration of 1 to $3 \times 10^{18}$ atoms/cm$^3$ to form semiconductor piezoresistance elements. Similarly, boron was implanted in a higher concentration than for the piezoresistance elements to form P type wirings so as to be connected to the piezoresistance elements. Further, a silicon oxide film was formed on the first surface 26 to protect the piezoresistance elements. Metal wirings were formed by sputtering an aluminum-based metal on the silicon oxide film, and they were connected to the P type wirings via through-holes formed in the silicon oxide film. The silicon oxide film formed on the piezoresistance elements also worked as an insulating film between the silicon of the first layer 24 and the metal wirings. Further, a silicon nitride film was formed thereon by chemical vapor deposition as a protective film on the metal wirings. The silicon oxide film, the metal wirings, and the silicon nitride film were processed into desired shapes by photolithography.

Then, after the photoresist pattern was formed in the first surface 26, the shapes shown in FIG. 1, namely, the first separation groove 14 for separating the inner frame 15 and the outer frame 16, and the second separation groove 29 for separating the weight portion and the inner frame 15, were processed by dry etching, with the beam portions 13 and the inner frame support portions 17 being left. Further, a photoresist pattern was formed in the second surface 27, whereafter the first separation groove 14 and the second separation groove 29 were processed by dry etching. Exposed parts of the silicon oxide film layer remaining between the first layer 24 and the second layer 25 were removed by wet etching. As a result, the first separation groove 14 and the second separation groove 29 penetrated the SOT wafer. According to the above-described manufacturing process, the weight portion 12, the inner frame 15, and the outer frame 16 were formed in the first layer 24 through the second layer 25. The beam portions 13 and the inner frame support portions 17 were formed in the first layer 24.

Then, according to the WLP technology, the upper cover 19 and the lower cover 22, each comprising silicon, were joined to the face and back of the acceleration sensor element 10 by metal bonding for encapsulation. For this purpose, in the acceleration sensor element before the above dry etching step, thin metal films for use in metal bonding were formed on the first surface 26 and the second surface 27 of the wafer. Two wafers to serve as the covers were provided with the same metal thin films and metal solders. These three wafers were superpose, and pressurized and heated for bonding. A gold-tin alloy was used for the metal solders.

Then, the upper cover 19 and the lower cover 22 were ground to thin the entire composite. On a side of the upper cover 19 to be joined to the acceleration sensor element 10, a groove was formed to a depth greater than the thickness of the upper cover after grinding so that after grinding, the electrode pads 18 of the acceleration sensor element 10 would be exposed. A side of the lower cover 22 need not be provided with such a groove, but may be structured similarly to the upper cover 19. Moreover, cavities were formed in parts of the upper cover 19 and the lower cover 22 which will face the weight portion 12 on their surfaces to be joined to the acceleration sensor element 10. A gap 31 between the weight portion 12 and the upper cover 19/lower cover 22 is the sum of the depth of the cavity (cavity depth 32) and the thickness of the joining material (joining material thickness 33). If the joining material thickness 33 may be taken, unchanged, as the gap 31, there is no need to form the above cavity.

The foregoing steps up to the grinding step were performed, with the state of the wafer being maintained. Finally, the composite was diced to separate it into the individual covered acceleration sensor elements 30. By the above-described manufacturing process, there was obtained the covered acceleration sensor element 30 having the inner frame 15 and the weight portion 12 supported in an airtight container composed of the outer frame 16, the upper cover 19, and the lower cover 22.

<Structure of Resin Package>

Figure 4:
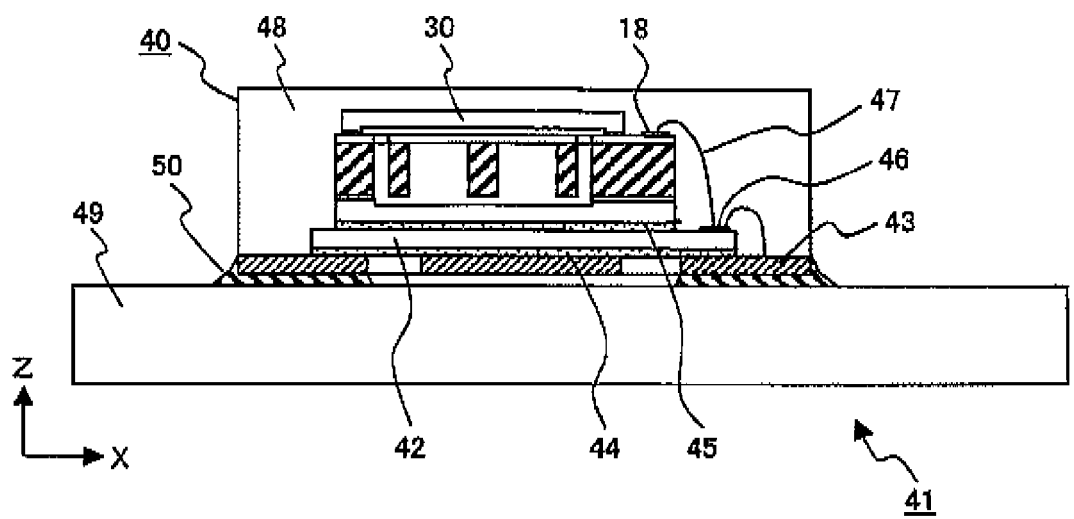
FIG. 4 is a schematic view showing a state in which an acceleration sensor assembled into a resin package is mounted on a product substrate.

FIG. 4 shows a sectional schematic view of an acceleration sensor mounted structure 41 having an acceleration sensor 40 mounted on a product substrate 49, the acceleration sensor 40 being produced by assembling the covered acceleration sensor element 30 of Embodiment 1 into a resin package. An IC chip 42 for control was adhered onto a lead frame 43 with the use of an adhesive material 44, and the covered acceleration sensor element 30 was adhered onto the IC chip 42 with the use of an adhesive material 45. Connections between the electrode pads 18 of the covered acceleration sensor element 30 and electrode pads 46 of the IC chip 42, and connections between the electrode pads 46 of the IC chip 42 and the lead frame 43 were provided by wire bonding using metal wires 47. Then, all the components were encapsulated with a molding resin 48 to obtain the acceleration sensor 40. A die attach film (DAF), which functions concurrently as a dicing tape and an adhesive material, can be used for the adhesive materials 44 and 45. A surface of the lead frame exposed at the lower surface of the acceleration sensor 40 was solder-plated, and joined to the product substrate 49 with the use of a solder 50 to obtain the acceleration sensor mounted structure 41.

<Inner Frame Support Portions>

In the covered acceleration sensor element 30 of the present invention, the inner frame 15 is separated from the outer frame 16, the upper cover 19 and the lower cover 22, as shown in FIG. 2, and is merely supported on the outer frame 16 at four locations in diagonal directions by the inner frame support portions 17 having flexibility, as shown in FIG. 1. Thus, even if external force acts on the outer frame 16, the upper cover 19 and the lower cover 22 under thermal stress during assembly into the resin package and during mounting on the product substrate to deform them, this deformation is minimally transmitted to the inner frame 15, thus causing little output change. Deformation of the outer frame 16 is somewhat transmitted to the inner frame 15 via the inner frame support portions 17. However, the inner frame support portions 17 are arranged in the diagonal directions relative to the beam portions 13. Thus, deformation of the inner frame 15 in the vicinity of the inner frame support portion 17 causes little change to the stress on the piezoresistance elements on the beam portions 13.

In FIG. 1, a change in the stress on the piezoresistance element by external force is apt to occur when compression or tension acts on the beam portion 13 in the longitudinal direction, or the beam portion 13 is warped. If stress on the inner frame 15 changes in a part near the junction of the beam portion 13, moreover, only the piezoresistance element close to the inner frame 15 changes, whereas the piezoresistance element close to the weight portion scarcely changes, so that an offset change in the Z-axis is liable to occur. In Embodiment 1, the junction of the inner frame support portion 17 is remote from the junction of the beam portion 13, and the stress change caused to the inner frame 15 by external force does not directly affect the beam portion 13. Thus, a change in output can be rendered very small.

Rigidity of Inner Frame Support Portion>

To ensure the responsiveness of the acceleration sensor, it is desirable to make the rigidity of the inner frame support portion 17 higher than that of the beam portion 13. When weight portion resonance frequency determined by the rigidity of the beam portion 13 and the weight of the weight portion 12 is compared with inner frame resonance frequency determined by the rigidity of the inner frame support portion 17 and the total weight of the inner frame 15 and the weight portion 12, it is desirable that the inner frame resonance frequency be sufficiently high compared with the weight portion resonance frequency. Otherwise, in response to a relatively quick change in acceleration, the inner frame 15 is displaced together with the weight portion, with the result that deformation of the beam portion 13 is hindered, failing to obtain correct sensitivity. It is desirable that the shape of the inner frame support portion 17 be determined such that the phase characteristics and gain characteristics of the frequency characteristics are apart from each other to a degree to which they will not be coupled.

<Symmetrical Support for Inner Frame>

Embodiment 1 ensures good symmetry, because the inner frame 15 is supported from all directions in the surroundings. If the inner frame 15 is supported by one of the inner frame support portions 17, or is connected to the lower cover 22 at one point of the inner frame 15, for example, the inner frame 15 is displaced in a cantilevered manner in response to the deformation of the Outer frame 16 and the lower cover 22, so that the relative displacement of the inner frame 15 relative to the upper cover 19 and the lower cover 22 is prone to increase. In this case, the gap needs to be rendered large so that the inner frame 15 and the weight portion 12 make no contact with the upper cover 19 and the lower cover 22. In the present embodiment, the inner frame 15 is supported from all directions in the surroundings, so that relative displacement of the inner frame 15 relative to the upper cover 19 and the lower cover 22 can be decreased, and the gap can be made small. Thus, under impact on the acceleration sensor, stress caused to the beam portion 13 can be rendered low, and impact resistance can be enhanced, because of the effect of minimizing acceleration owing to a short distance until the collision of the weight portion 12 with the upper cover 19 or the lower cover 22, and the effect of increasing air damping. Since air damping can be increased, there arise the effects that high frequency vibrations can be suppressed, vibrations of resonance of the weight portion 12 can be kept down, and noise can be reduced.

Joining of Cover Body>

Furthermore, Embodiment 1 is easy in terms of the manufacturing process as compared with the joining of the inner frame 15 to the lower cover 22. As described above, in joining each of the upper cover 19 and the lower cover 22 with the use of the metal solder, it is necessary to perform heating during pressurization. When it is attempted to join the inner frame 15 only to the lower cover 22, a sufficient pressurizing force cannot be exerted on the junction of the inner frame 15, because the inner frame 15 is flexibly connected to the outer frame 16. Thus, there is no choice but to perform a two-step procedure, such as joining the acceleration sensor element 10 to the lower cover 22 first, and then joining the upper cover 19 to the acceleration sensor element 10. In joining the acceleration sensor element 10 to the lower cover 22, the surface of the acceleration sensor element 10, which is easily breakable, has to be directly pressurized. If the junctions exist only in the outer frame 16, and the junctions of the upper cover 19 and the junctions of the lower cover 22 are different, as in Embodiment 1, sufficient press ing force can be applied to the junctions.

Embodiment 2

Figure 5:
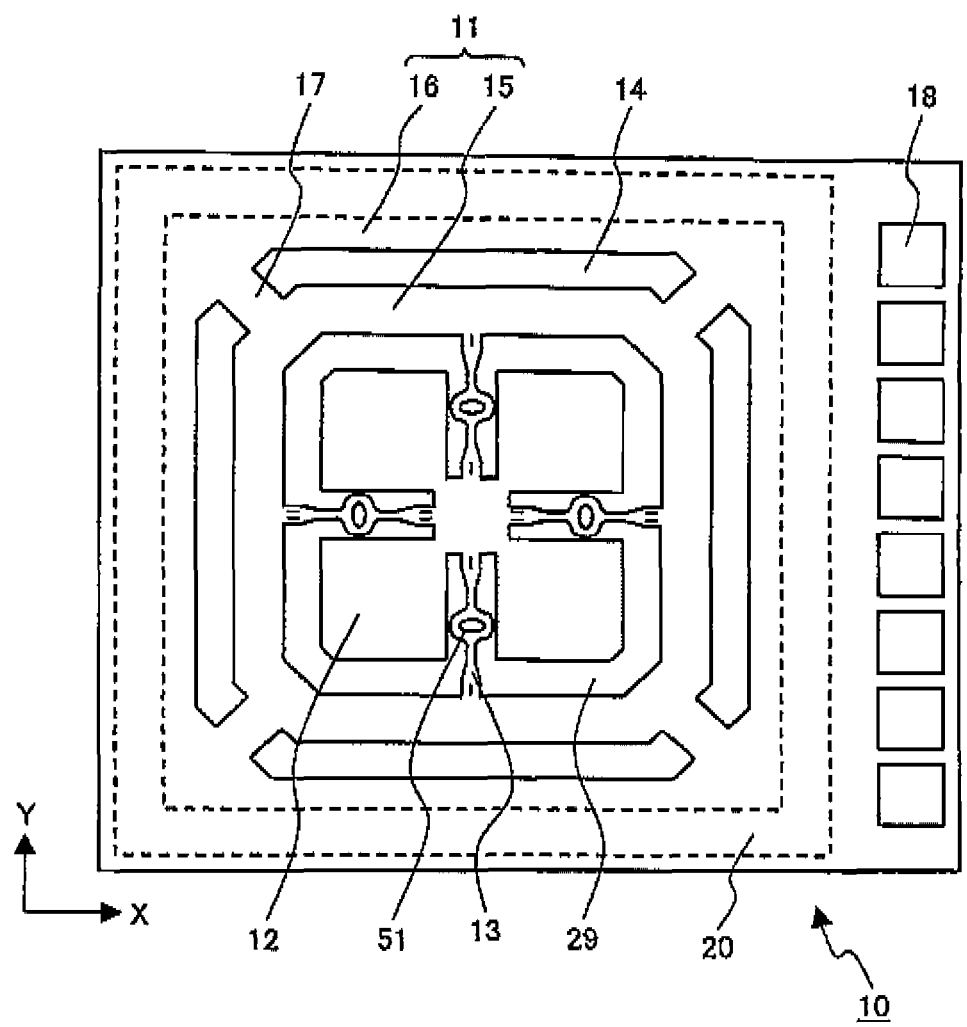
FIG. 5 is a plan view showing the acceleration sensor element having ring-shaped beam portions.

FIG. 5 is a schematic plan view showing the structure of an acceleration sensor element 10 of Embodiment 2. The acceleration sensor element 10 is of a shape in which ring portions 51 are provided as compressive stress absorbing portions in the center of the beam portions 13. The silicon oxide film formed on the surface of the acceleration sensor element 10 is smaller in the coefficient of thermal expansion than silicon, and annealing is carried out at a high temperature of, say, 950° C. during film formation. Thus, thermal stress occurs during cooling to ordinary temperature. The weight portion 12 and the inner frame 15 are formed in the first layer 24 through the second layer 25, and the second layer 25 is so thick that it shrinks with nearly the same coefficient of thermal expansion as that of silicon. The beam portion 13 consists of the first layer 24 alone, and thus, its proportion of the silicon oxide film is high, and its thermal shrinkage is low. Thus, the beam portion 13 undergoes compression between the inner frame 15 and the weight portion 12. If the beam portion 13 is thinned in order to increase the sensitivity of the sensor, the beam portion 13 may buckle under the above compressive force, causing an increase in the instability of the sensitivity or a great offset change.

By providing the ring portions 51 in the beam portions 13, as in Embodiment 2, the above compressive force can be absorbed, and buckling can be prevented, so that a high sensitivity acceleration sensor element can be designed. Various shapes are conceivable for the ring portion 51, for example, a shape of three rings connected together. The shape may be determined so that the compressive force can be absorbed by deformation, and such that stress does not concentrate, for example, in the R-section of the ring.

<Results of Analysis of Design Example>

A design, example in Embodiment 2 of FIG. 5 will be shown. The acceleration sensor element 10 measured 1.32 mm in the X direction and 1.18 mm in the Y direction. The X- and Y-dimension of the weight portion were each 560 μm. The beam portion 13 had a length of 240 μm. The width of the piezoresistance element formation portion was 28 μm. The inner frame support portion 17 had a length of 50 μm, a connection width of 160 μm on the side of the outer frame 16, and a connection width of 150 μm on the side of the inner frame 15. The thickness of the first layer was 4 μm, and the thickness of the second layer was 400 μm. The width of the inner frame 15 was 70 μm.

The acceleration sensor element 10 was assembled into the resin package to obtain the acceleration sensor 40, which was mounted on the product substrate 49 with a thickness of 0.6 mm. Changes in the characteristics of the acceleration sensor 40 before and after its mounting on the product substrate 49 were evaluated using FEM analysis. In the conventional structure example in which the acceleration sensor element was of the same size and the support frame portion was not separated into the outer frame and the inner frame, the change in the Z-axis output before and after mounting was about 23% expressed as a proportion to the Z-axis sensitivity, whereas this change could be kept down to about 4% with the above-mentioned design example of the acceleration sensor. The weight portion resonance frequencies of the present design example were 2.0 kHz in each of the X direction and the Y direction, and 3.2 kHz in the Z direction, while the inner frame resonance frequency was about 46 kHz. Since the inner frame resonance frequency is sufficiently high, it does not affect sensor sensitivity.

Embodiment 3

Figure 6:
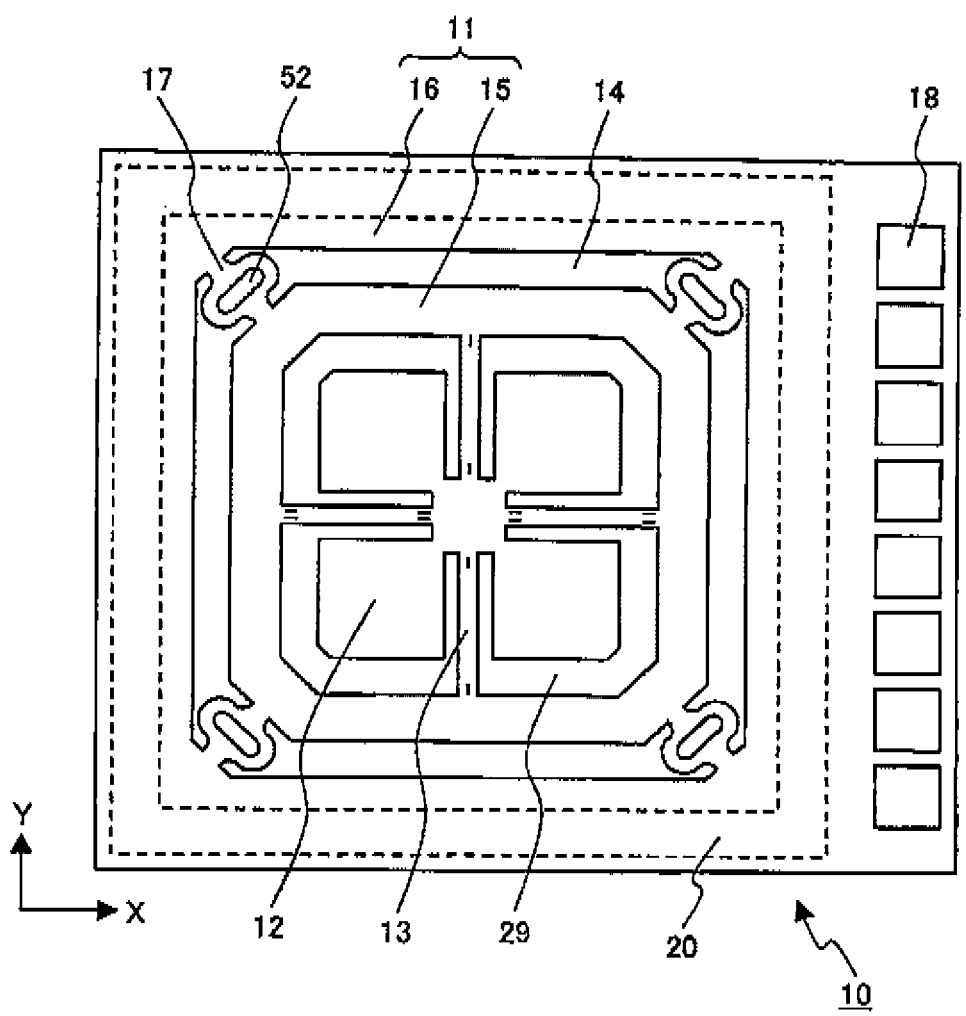
FIG. 6 is a plan view showing the acceleration sensor element having ring-shaped inner frame support portions.

FIG. 6 is a schematic plan view showing the structure of an acceleration sensor element 10 of Embodiment 3. The acceleration sensor element 10 is of a shape in which ring portions 52 are provided as compressive stress absorbing portions in the inner frame support portions 17. This configuration has the effect of preventing the inner frame support portion 17 from buckling, as in Embodiment 2. If the inner frame support portion 17 buckles, the inner frame 15 is displaced to approach the upper cover 19 or the lower cover 22. Thus, it is difficult to make the gap 31 small. By forming the ring portions 52 in the inner frame support portions 17, buckling can be prevented. Also, the formation of the ring portions 52 in the inner frame support portions 17 has the effect of absorbing the influence of the deformation of the outer frame 16, thus making the output less changeable.

Embodiment 4

Figure 7:
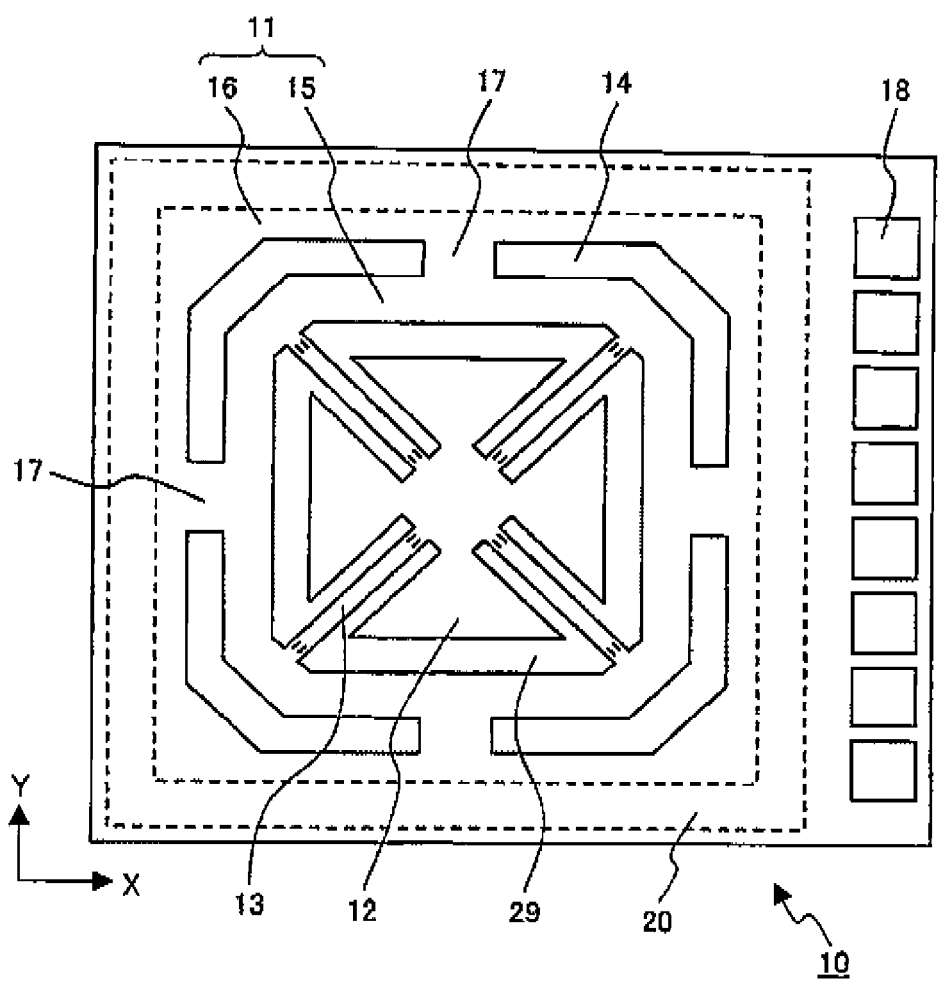
FIG. 7 is a plan view showing the acceleration sensor element having beam portions and inner frame support portions rotated nearly 45 degrees with respect to a support frame portion.

FIG. 7 is a schematic plan view showing the structure of an acceleration sensor element 10 of Embodiment 4. In this acceleration sensor element 10, the arrangements of the beam portions 13 and the inner frame support portions 17 are rotated nearly 45 degrees. The inner frame support portions 17 are arranged in the directions of the X-axis and the Y-axis, while the beam portions 13 are arranged in a direction at nearly 45 degrees with respect to the inner frame support portions 17. Thus, the relative relationship between the inner frame support portions 17 and the beam portions 13 is maintained. By arranging the beam portions 13 in the diagonal direction of the square acceleration sensor element 10, the beam portions 13 can be lengthened, thereby making it easy to increase the sensitivity of the sensor.

Figure 8:
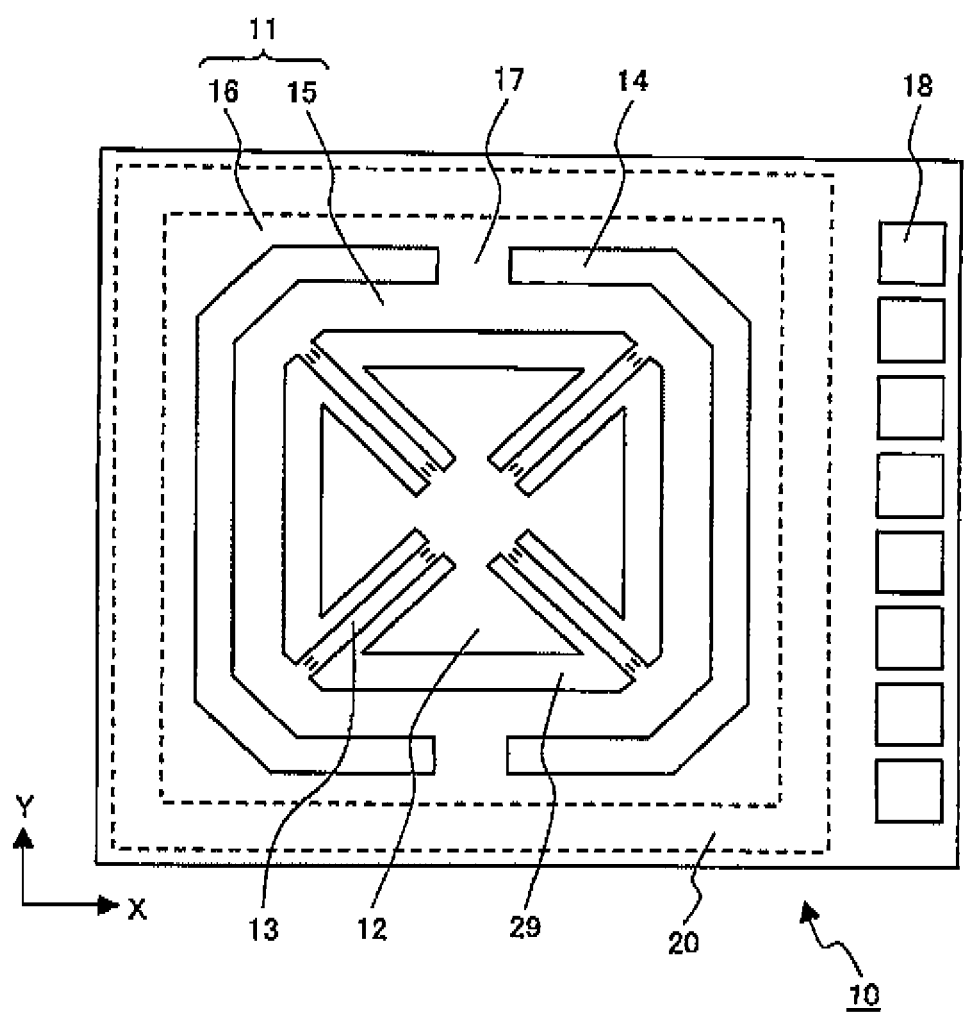
FIG. 8 is a plan view showing the acceleration sensor element having the inner frame support portions arranged only in one direction.

In the structure of Embodiment 4, the number of the inner frame support portions 17 may be two. An example of the inner frame support portions 17 formed only at two locations in the Y direction is shown in FIG. 8. If the electrode pads are arranged on one side along the Y-axis, as in the present example, a shape of only this side protruding appears, thus resulting in poor symmetry with respect to the Y-axis. In assembling this structure into the resin package of FIG. 4, too, only the above side is subjected to wire bonding, so that the electrode pads are arranged in a shifted manner so as to render this side broad. In the case of Embodiment 4, as described above, the structure is symmetrical with respect to the X-axis, but its symmetry with respect to the Y-axis worsens. Thus, the inner frame 15 is connected to the outer frame 16 only in the Y-axis direction, whereby it becomes possible to improve the symmetry of the influence of external force transmitted to the beam portions 13 while minimally transmitting to the inner frame 15 the influence of poorly symmetrical deformation in the X direction. Deformations symmetrical with respect to the X-axis and the Y-axis do not influence X-axis output and Y-axis output, and thus they are effective, particularly, in suppressing changes in the outputs on the X-axis and the Y-axis.

Embodiment 5

Figure 9:
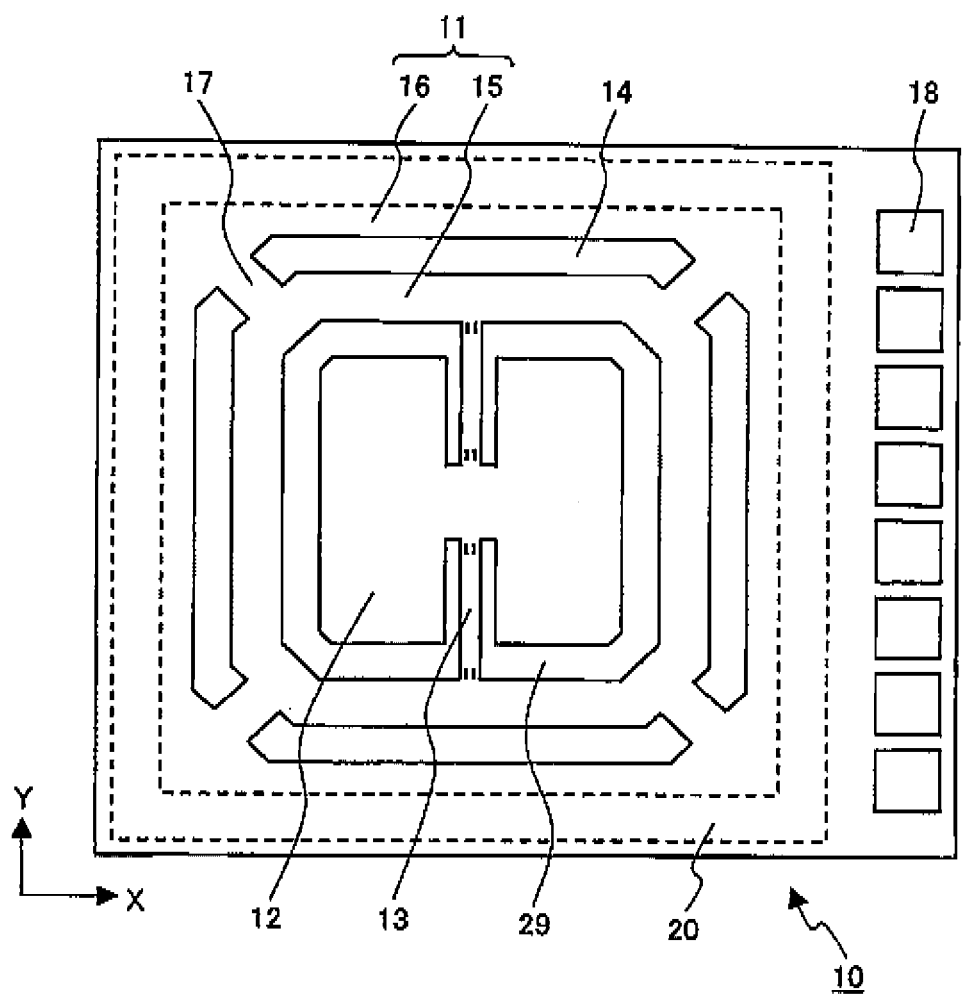
FIG. 9 is a plan view showing the acceleration sensor element having the beam portions arranged only in one direction.

FIG. 9 is a schematic plan view showing the structure of an acceleration sensor element 10 of Embodiment 5. Embodiments 1 to 4 show examples of having four of the beam portions 13, but the present invention can also be applied to an acceleration sensor element for biaxial detection which has only two of the beam portions 13 in one direction. Embodiment 5 involves two of the beam portions 13 in the Y-axis direction, and is designed to be capable of detecting accelerations in the Y-axis direction and the Z-axis direction. Similarly, the acceleration sensor element may have only two of the beam portions 13 in the X direction, and may be designed to be capable of detecting accelerations in the X-axis direction and the Z-axis direction.

Figure 10:
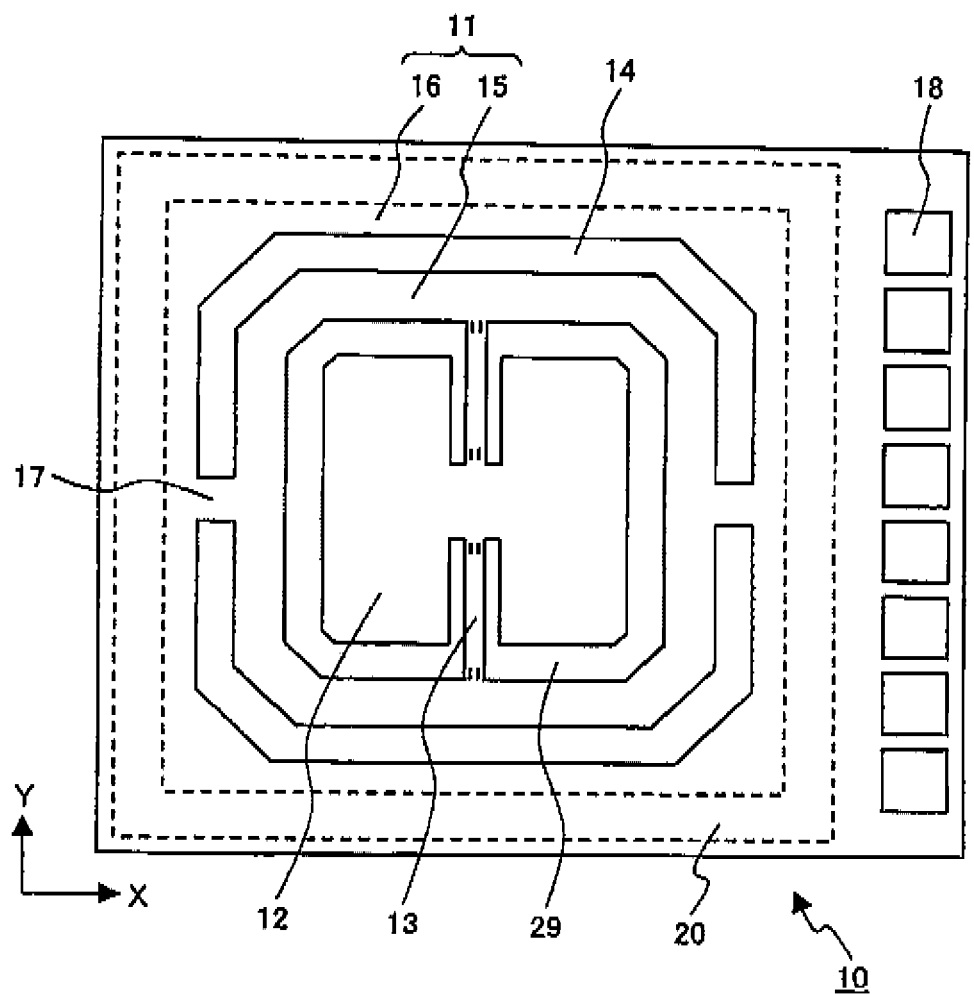
FIG. 10 is a plan view showing the acceleration sensor element having the beam portions and the inner frame support portions arranged in directions perpendicular to each other.
Figure 11:
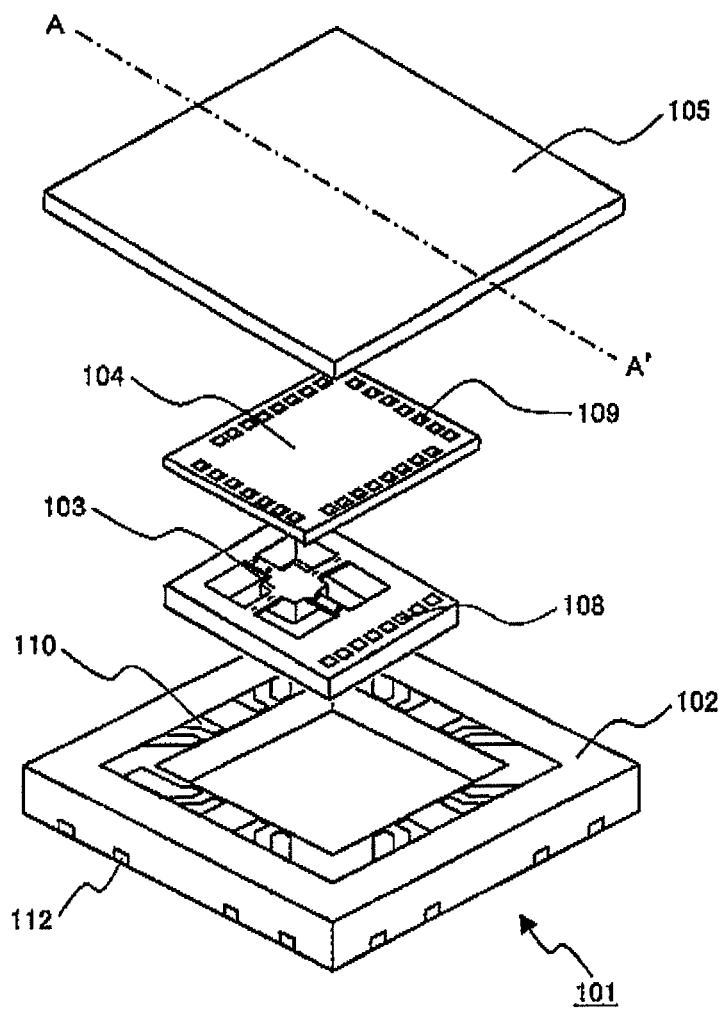
FIG. 11 is an exploded perspective view illustrating a conventional triaxial acceleration sensor.
Figure 12:
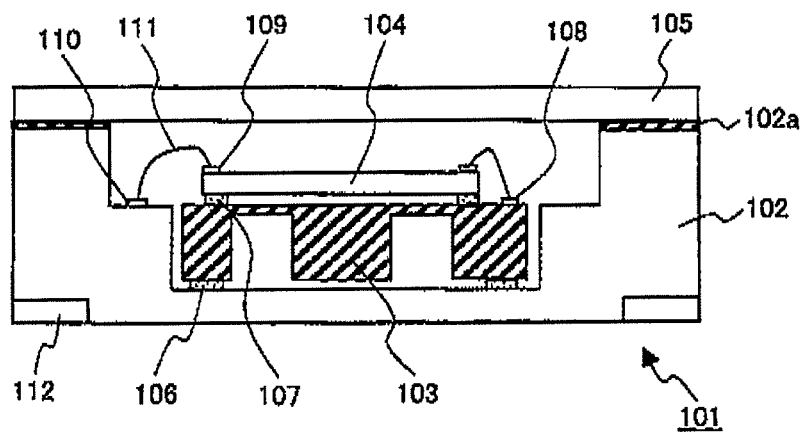
FIG. 12 is a sectional view illustrating the conventional triaxial acceleration sensor.

With the acceleration sensor element 10 having two of the beam portions 13, the inner frame support portions 17 may be arranged in a direction at nearly 90 degrees with the respect to the beam portions 13, as shown in FIG. 10. The main effects of the present invention are obtained by arranging the junctions of the inner frame support portions 17 to the inner frame 15 at positions as remote as possible from the junctions of the beam portions 13 to the inner frame 15. If there are two of the beam portions 13 in the Y direction, as in Embodiment 5, therefore, two of the inner frame support portions 17 are provided in the X direction. By so doing, the remotest arrangement is ensured, so that the influence of the deformation of the outer frame 16 can be transmitted to the beam portions 13 more difficulty.

Modified Embodiments

In the present invention, the inner frame support portions 17 are arranged in a direction at nearly 45 degrees or nearly 90 degrees with respect to the beam portions 13. However, even if the angle is not accurately 45 degrees or 90 degrees, the same effects are obtained by arranging the junctions of the inner frame support portions 17 to the inner frame 15 to be sufficiently remote from the junctions of the beam portions 13 to the inner frame 15. For example, if the inner frame support portions 17 are arranged in a direction at 45 degrees with respect to the beam portions 13, certain effects are existent even when they are arranged symmetrically in a range at an angle of 45 degrees±15 degrees. If they are arranged symmetrically in the 45±5 degree range, they can be used equivalently to their arrangement at 45 degrees, depending on the specifications and characteristics demanded.

Moreover, the characteristics of the arrangement of the inner frame support portions 17 and the addition of the ring portions shown in Embodiments 1 to 5 can be used in combinations.

REFERENCE SIGNS LIST

10 Acceleration sensor element, 11 Support frame portion, 12 Weight portion, 13 Beam portion, 13a First beam portion, 13b Second beam portion, 13c Third beam portion, 13d. Fourth beam portion, 14 First groove portion, 15 Inner frame, 16 Outer frame, 17 Inner frame support portion, 19 Upper cover, 22 Lower cover, 29 Second separation groove, 30 Covered acceleration sensor element, 31 Gap, 32 Cavity depth, 40 Acceleration sensor, 41 Acceleration sensor mounted structure, 42 IC chip, 43 Lead frame, 44 Adhesive material, 45 Adhesive material, 47 Metal wire, 48 Molding resin, 49 Product substrate, 51 Ring portion, 52 Ring portion, 101 Triaxial acceleration sensor, 102 Case, 103 Acceleration sensor element, 104 IC, 105 Cover, 106 Resin adhesive material, 107 Resin adhesive material, 111 Wire, 113 Support frame portion, 114 Weight portion, 115 Beam portion, 116 X-axis piezoresistance element, 117 Y-axis piezoresistance element, 118 Z-axis piezoresistance element, 120 Triaxial acceleration sensor element, 121 Upper cover, 122 Lower cover, 123 Joining metal region, 124 Covered acceleration sensor element, 125 Triaxial acceleration sensor, 126 Lead frame, 127 IC, 132 Wire, 133 Molding resin, 134 Product substrate, P Piezoresistance element

The invention claimed is:

1. A covered acceleration sensor element including:
a weight portion, a support frame portion surrounding the weight portion, a plurality of flexible beam portions for connecting the weight portion to the support frame portion, piezoresistance elements provided on the beam portions, and wirings for connecting the piezoresistance elements,
the covered acceleration sensor element being configured such that an upper cover and a lower cover enclosing a periphery of the weight portion together with the support frame portion are joined to a face and a back of the support frame portion, and
the covered acceleration sensor element being adapted to detect acceleration in a direction of a first axis as a thickness direction in which the upper cover, the support frame portion, and the lower cover are stacked, and acceleration in a direction of at least one of a second axis in a plane perpendicular to the first axis, or a third axis in the plane and perpendicular to the second axis, from changes in resistances of the piezoresistance elements,
wherein the support frame portion is separated by separation grooves into an inner frame and an outer frame surrounding a periphery of the inner frame, the upper cover and the lower cover are joined to the outer frame, and the inner frame is connected to and held by the outer frame via a plurality of inner frame support portions having flexibility, and
the beam portions are connected to both sides of the weight portion along at least one of the second axis or the third axis, and the inner frame support portions are connected to both sides of the inner frame at a predetermined angle from the at least one of the second axis or the third axis,
wherein individual ones of the inner frame support portions have opposing ends connected to the inner frame and the outer frame, respectively, and both of the opposing ends are disposed at the predetermined angle from the at least one of the second axis or the third axis,
wherein the beam portions are connected to both sides of the weight portion along both of the second axis and the third axis, and the inner frame support portions are connected to both sides of the inner frame at the predetermined angle from both of the second axis and the third axis, and
wherein the beam portions are connected to both sides of the weight portion along both of the second axis and the third axis, and the inner frame support portions are connected to both sides of the inner frame 30 to 60 degrees from both of the second axis and the third axis.

2. The covered acceleration sensor element according to claim 1, wherein
the accelerations on the first axis and the second axis are detected, the beam portions are connected to both sides of the weight portion along the second axis, and the inner frame support portions are connected to both sides of the inner frame in the plane in the direction of the third axis perpendicular to the second axis.

3. The covered acceleration sensor element according to claim 1, wherein
compressive stress absorbing portions are provided in either the inner frame support portions or the beam portions or in both of the inner frame support portions and the beam portions.

4. The covered acceleration sensor element according to claim 1, wherein
the beam portion and the inner frame support portion have an identical thickness, and the thickness is smaller than a thickness of the weight portion and a thickness of the support frame portion.

5. The covered acceleration sensor element according to claim 1, wherein
flexural rigidity of the inner frame support portion is higher than flexural rigidity of the beam portion.

6. A covered acceleration sensor element including:
a weight portion, a support frame portion surrounding the weight portion, a plurality of flexible beam portions for connecting the weight portion, to the support frame portion, piezoresistance elements provided on the beam portions, and wirings for connecting the piezoresistance elements, the covered acceleration sensor element being configured such that an upper cover and a lower cover enclosing a periphery of the weight portion together with the support frame portion are joined to a face and a back of the support frame portion, and the covered acceleration sensor element being adapted to detect acceleration in a direction of a first axis as a thickness direction in which the upper cover, the support frame portion, and the lower cover are stacked, and acceleration in a direction of at least one of a second axis in a plane perpendicular to the first axis, or a third axis in the plane and perpendicular to the second axis, from changes in resistances of the piezoresistance elements, wherein the support frame portion is separated by separation grooves into an inner frame and an outer frame surrounding a periphery of the inner frame, the upper cover and the lower cover are joined to the outer frame, and the inner frame is connected to and held by the outer frame via a plurality of inner frame support portions having flexibility, and the beam portions are connected to both sides of the weight portion along at least one of the second axis or the third axis, and the inner frame support portions are connected to both sides of the inner frame at a predetermined angle from the at least one of the second axis or the third axis, wherein the accelerations on the first axis and the second axis are detected, the beam portions are connected to both sides of the weight portion along the second axis, and the inner frame support portions are connected to both sides of the inner frame 30 to 60 degrees from the second axis in the plane.

7. An acceleration sensor, comprising:

the covered acceleration sensor element according to claim 1;

an IC chip for control; and a lead frame onto which the covered acceleration sensor element and the IC chip are adhered, wherein the lead frame, electrodes on the IC chip, and electrodes on the covered acceleration sensor element are interconnected by metal wires, and the lead frame, the IC chip, and the covered acceleration sensor element are encapsulated using a molding resin.

* * * * *